US008308212B2

(12) United States Patent
Schrand

(10) Patent No.: US 8,308,212 B2
(45) Date of Patent: Nov. 13, 2012

(54) COT FASTENING SYSTEM

(75) Inventor: Steve Schrand, Cincinnati, OH (US)

(73) Assignee: Ferno-Washington, Inc., Wilmington, OH (US)

( * ) Notice: Subject to any disclaimer, the term of this patent is extended or adjusted under 35 U.S.C. 154(b) by 183 days.

(21) Appl. No.: 12/667,749

(22) PCT Filed: Jul. 3, 2008

(86) PCT No.: PCT/US2008/069167
§ 371 (c)(1),
(2), (4) Date: Apr. 27, 2010

(87) PCT Pub. No.: WO2009/009422
PCT Pub. Date: Jan. 15, 2009

(65) Prior Publication Data

US 2010/0201145 A1 Aug. 12, 2010

Related U.S. Application Data

(60) Provisional application No. 60/958,593, filed on Jul. 6, 2007.

(51) Int. Cl.
*B60P 7/08* (2006.01)
*A61G 3/02* (2006.01)
*A61G 1/02* (2006.01)

(52) U.S. Cl. ................ 296/20; 410/7; 410/80; 414/921; 296/18

(58) Field of Classification Search .................... 296/19, 296/20, 18; 410/7, 80; 414/921
See application file for complete search history.

(56) References Cited

U.S. PATENT DOCUMENTS

| | | | | |
|---|---|---|---|---|
| 5,092,722 | A * | 3/1992 | Reazer et al. | 410/104 |
| 5,205,601 | A * | 4/1993 | Ferris | 296/20 |
| 6,796,757 | B1 * | 9/2004 | Way et al. | 410/69 |
| 7,490,884 | B2 | 2/2009 | Matunaga et al. | |
| 7,775,574 | B2 | 8/2010 | Matunaga et al. | |

FOREIGN PATENT DOCUMENTS

| | | | |
|---|---|---|---|
| FR | 2830437 | * | 4/2003 |
| FR | 2830437 | A1 | 4/2003 |
| WO | 2006067889 | A1 | 6/2006 |

OTHER PUBLICATIONS

International Search Report and Written Opinion completed Jun. 23, 2009 pertaining to International Application No. PCT/US2008/069167.
Written Opinion mailed Jan. 21, 2010 pertaining to International Application No. PCT/US2008/069167.
Israeli Office Action dated Jan. 16, 2012 pertaining to International Application No. PCT/US2008/069167.

* cited by examiner

*Primary Examiner* — Dennis Pedder
(74) *Attorney, Agent, or Firm* — Dinsmore & Shohl, LLP

(57) ABSTRACT

A method and cot fastening system for a patient transport vehicle having a rearwardly located patient access which meet the pull requirements for vertical and lateral movement are disclosed. The system comprises a rear mounting part, which mounts on the floor of the transport vehicle adjacent the patient access; a forward mounting part which mounts on the floor forward of the access, rails connecting the rear mounting part to the forward mounting part, and a release mechanism. The rails of the cot fastening system help guide the cot into the vehicle and to the forward mounting part. When the cot has reached the forward mounting part, a cross-member which forms part of the cot undercarriage, is urged against a pair of automatically locking securing mechanisms of the forward mounting part which secures the cot thereto as well as to the rear mounting part via catches.

14 Claims, 12 Drawing Sheets

COT FASTENING SYSTEM

This invention relates to fastening systems and is particularly concerned with systems for fastening cots in ambulances and other patient transport vehicles.

In addition to various safety regulations and government standards, general concern for quality and reliability requires an ambulance cot to be firmly restrained in a transport bay of an emergency vehicle in the event that the vehicle undergoes sudden driving maneuvers, or crashes. For example, the ambulance cot when secured in the transport bay of an emergency vehicle must be able to meet a forward pull of 6,000 lbs., vertical pull of 3,000 lbs., lateral pull of 3,000 lbs., and rearward pull of 3,900 lbs. without breaking free from it's fastening system in order to meet the industry standard.

According to the present invention, a method and cot fastening system for a patient transport vehicle having a rearwardly located patient access which meet the pull requirements for vertical and lateral movement are disclosed. The system comprises a rearward mounting part, which mounts on the floor of the transport vehicle adjacent the patient access; a forward mounting part which mounts on the floor forward of the access, rails connecting the rearward mounting part to the forward mounting part, and a release mechanism. The rails of the cot fastening system help guide the cot into the vehicle and to the forward mounting part. When the cot has reached the forward mounting part, a cross-member which forms part of the cot undercarriage, is urged against a pair of automatically locking securing mechanisms of the forward mounting part which secures the cot thereto as well as to the rearward mounting part via at least one mounting peg of the cot.

In one embodiment, a fastening system for securing a cot with a cross-member and at least one mounting peg to a mobile transport vehicle is disclosed. The fastening system comprises a forward mounting part; a rearward mounting part; a pair of automatically locking securing mechanisms attached to the forward mounting part and configured to secure the cross-member of the cot thereto; a rearwardly located securing mechanism attached to the rearward mounting part and configured to secure to the at least one mounting peg of the cot; rails connecting the forward mounting part with the rearward mounting part, wherein the rails are configured to guide cross-member of the cot into the pair of automatically locking securing mechanisms and the at least one mounting peg into the rearwardly located securing mechanism; and a release mechanism connected to the pair of automatically locking securing mechanisms and the rearward mounting part, wherein the release mechanism is configured to release the cross-member of the cot from the pair of automatically locking securing mechanisms when secured thereto upon activation of the release mechanism.

In another embodiment, a combination cot and fastening system for securing the cot to a mobile transport vehicle is disclosed. The combination comprises the cot having legs, a patient support surface attached to the legs, the legs configured to hinge upwardly away and fold rearwardly under the patient support surface when pushing the cot into the transport vehicle, and unfold when removing the cot from the transport vehicle in an opposite direction, a cross-member, and at least one mounting peg configured to rotate downwardly when loading the cot into the transport vehicle. The combination further comprises the fastening system having a forward mounting part, a rearward mounting part, a pair of automatically locking securing mechanisms attached to the forward mounting part and configured to secure the cross-member of the cot thereto, a rearwardly located securing mechanism attached to the rearward mounting part and configured to secure to the at least one mounting peg of the cot when rotated downwardly, rails connecting the forward mounting part with the rearward mounting part, wherein the rails are configured to guide cross-member of the cot into the pair of automatically locking securing mechanisms and the at least one mounting peg into the rearwardly located securing mechanism, and a release mechanism connected to the pair of automatically locking securing mechanisms and the rearward mounting part, wherein the release mechanism is configured to release the cross-member of the cot from the pair of automatically locking securing mechanisms when secured thereto upon activation of the release mechanism.

In still another embodiment, a method of fastening a cot to a mobile transport vehicle is disclosed. The method comprises providing a cot having a cross-member and at least one mounting peg, and providing to the mobile transport vehicle a fastening system having a forward mounting part, a rearward mounting part, a pair of automatically locking securing mechanisms attached to the forward mounting part and configured to secure the cross-member of the cot thereto, a rearwardly located securing mechanism attached to the rearward mounting part and configured to secure to the at least one mounting peg of the cot when rotated downwardly, rails connecting the forward mounting part with the rearward mounting part, wherein the rails are configured to guide cross-member of the cot into the pair of automatically locking securing mechanisms and the at least one mounting peg into the rearwardly located securing mechanism, and a release mechanism connected to the pair of automatically locking securing mechanisms and the rearward mounting part. The release mechanism is configured to release the cross-member of the cot from the pair of automatically locking securing mechanisms when secured thereto upon activation of the release mechanism. The method also includes transitioning the cot along the rails which guide the cot into the pair of automatically locking securing mechanisms to secure automatically the cross-member thereto as well as the mounting peg to the rearwardly located securing mechanism.

These, and other features and advantages of the present invention will become apparent from the following detailed description, and the accompanying drawings.

The present invention is illustrated by way of example, and not limitation, in the accompanying figures, in which like references indicate similar elements, and in which.

Figure 1:
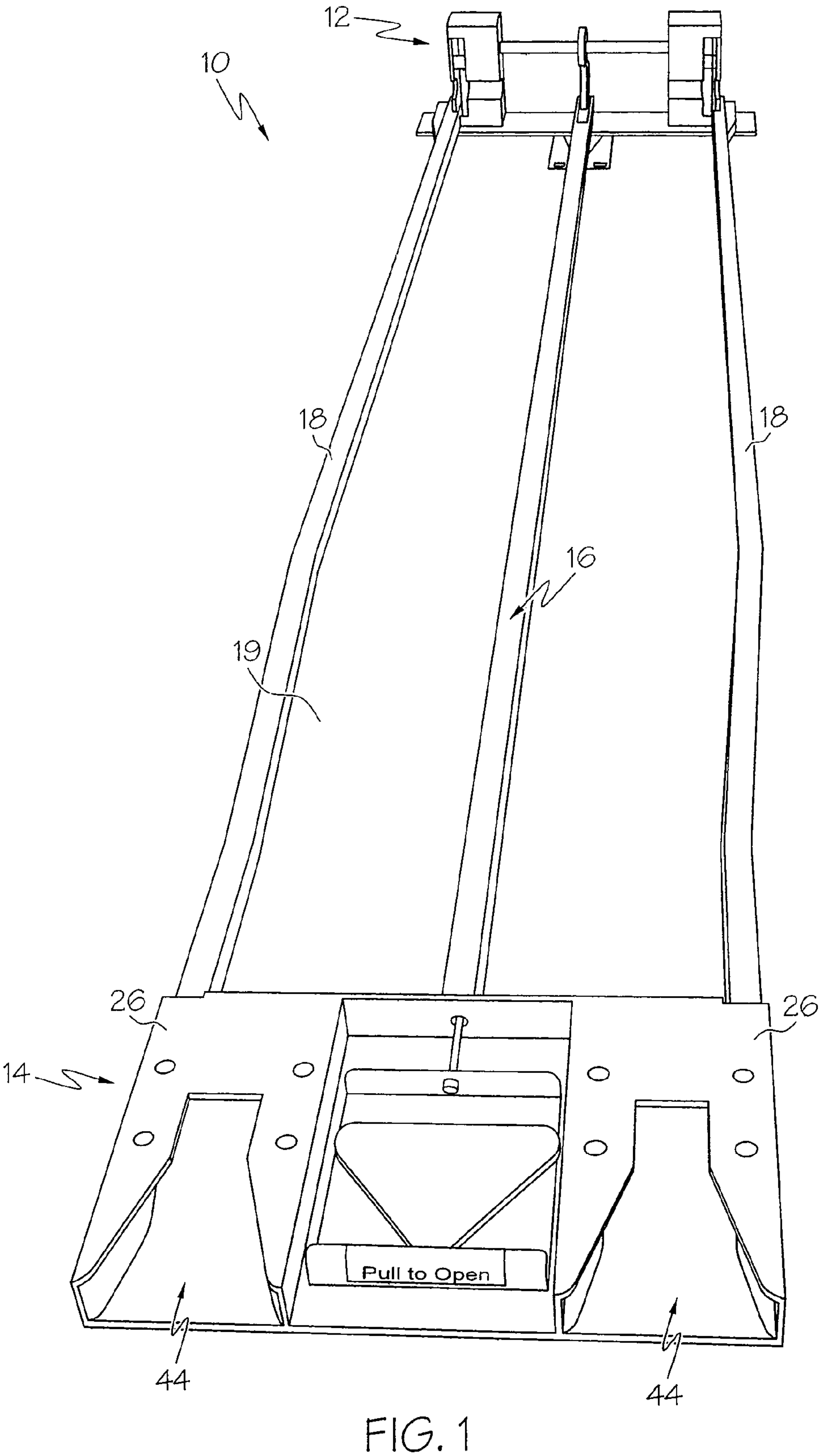
FIG. 1 is a perspective view from above of one embodiment of a cot fastening system according to the present invention.

Skilled artisans appreciate that the elements in the figures are illustrated for simplicity and clarity, and have not necessarily been drawn to scale. For example, the dimensions of some of the elements in the figures may be exaggerated relative to other elements to help to improve the understanding of the embodiment(s) of the present invention.

Referring to all the figures in which like parts are like numbered, the cot fastening system 10 essentially comprises four parts—a forward mounting part 12, a rearward mounting part 14, a release mechanism 16, and rails 18 interconnecting the mounting parts 12 and 14. The cot fastening system 10 is sized to mount to a standardized mounting footprint currently provided in a floor 19 of a patient transport vehicle.

Figure 6:
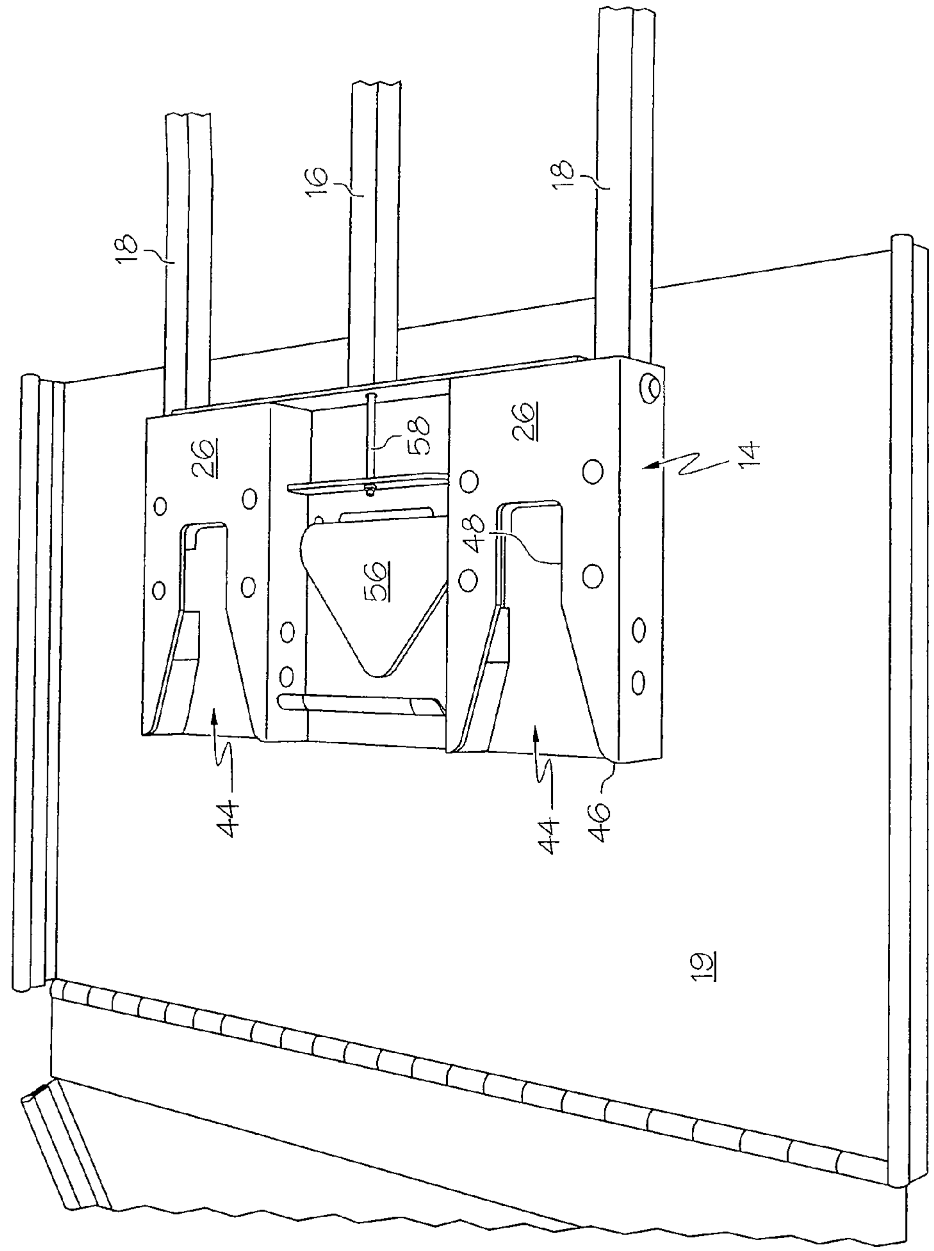
FIG. 6 is a perspective view from a side of a rearward mounting part the cot fastening system depicted in FIG. 1.
Figure 10:
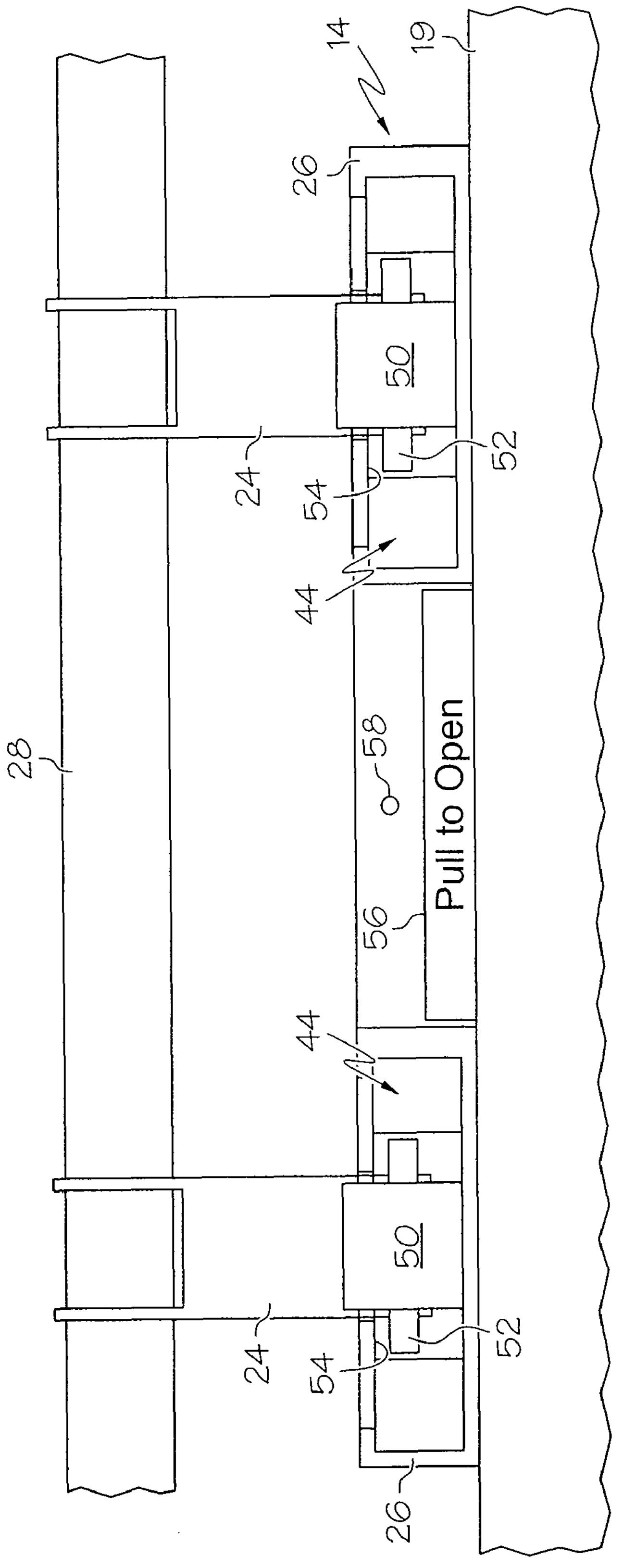
FIG. 10 is a rear perspective view of a roll-in cot in the folded position with the mounting pegs engaged in catches of the cot fastening system according to the present invention.

The forward mounting part 12 comprises a pair of automatically locking securing mechanisms 20 and 22. The securing mechanisms 20, 22 are mounted to a plate 23, which also mounts rails 18 at a forward end. In one embodiment, the rails 18 and securing mechanisms 20, 22 are so spaced to guide and locate a pair of mounting pegs 24 within wedge-shaped catches 26 of the rearward mounting part 14 as shown in FIG. 10. As shown by FIG. 6, the rails 18 at a rearward end mount to the catches 26. It is to be appreciated that rails 18, plate 23, catches 26 are adapted for securement to the floor 19 of a vehicle. Except for the mounting points of the rails to the floor 19, remaining portions of the rails 18 rise above the floor when the cot fastening system is mounted thereto, which facilitates easier cleaning of the floor around the rails.

Figure 7:
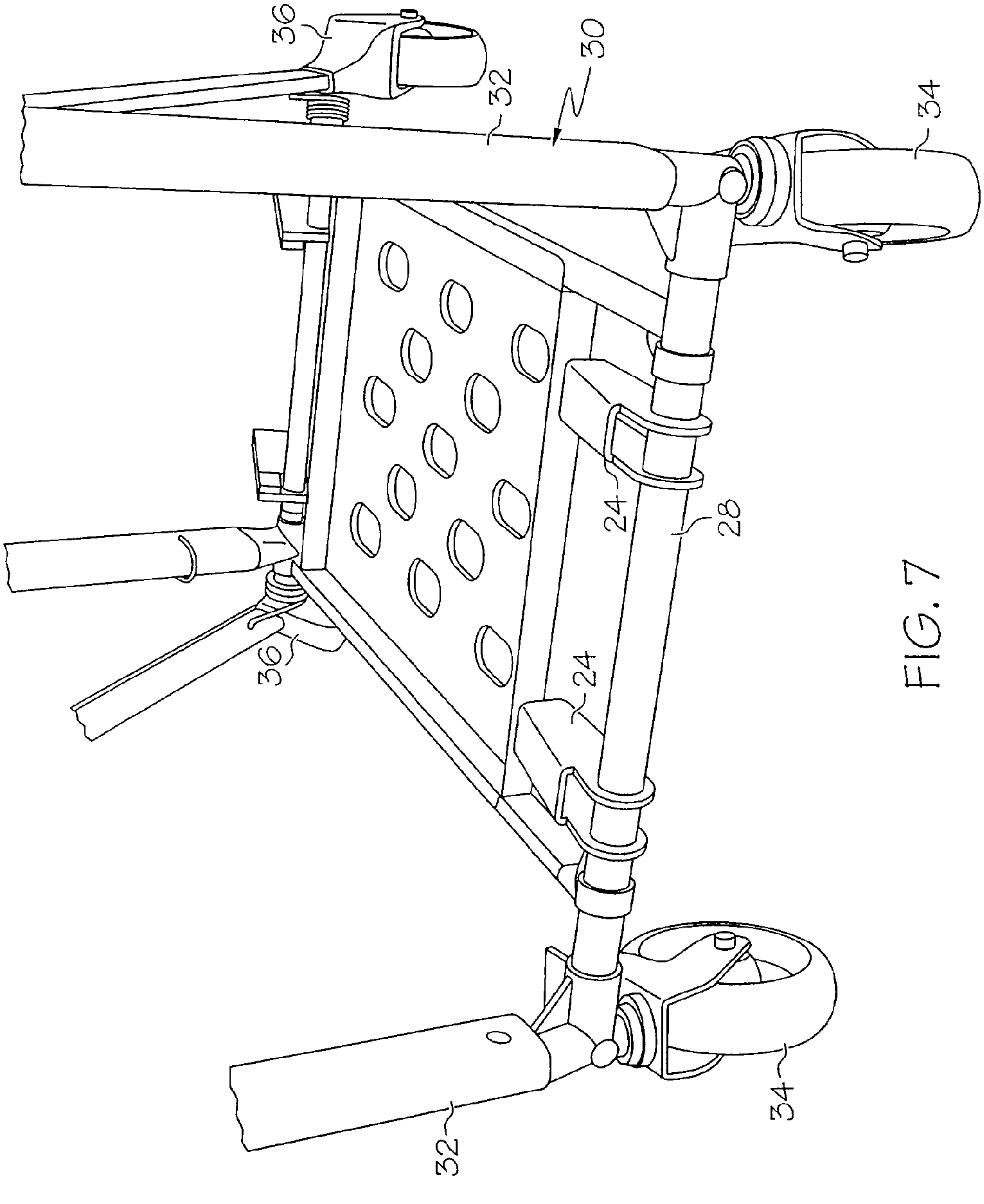
FIGS. 7 and 8 are perspective views (front and side, respectively) of a roll-in cot in an upright position having drop-down hooking pegs (in a stowed, non-interfering position) according to the present invention.
Figure 8:
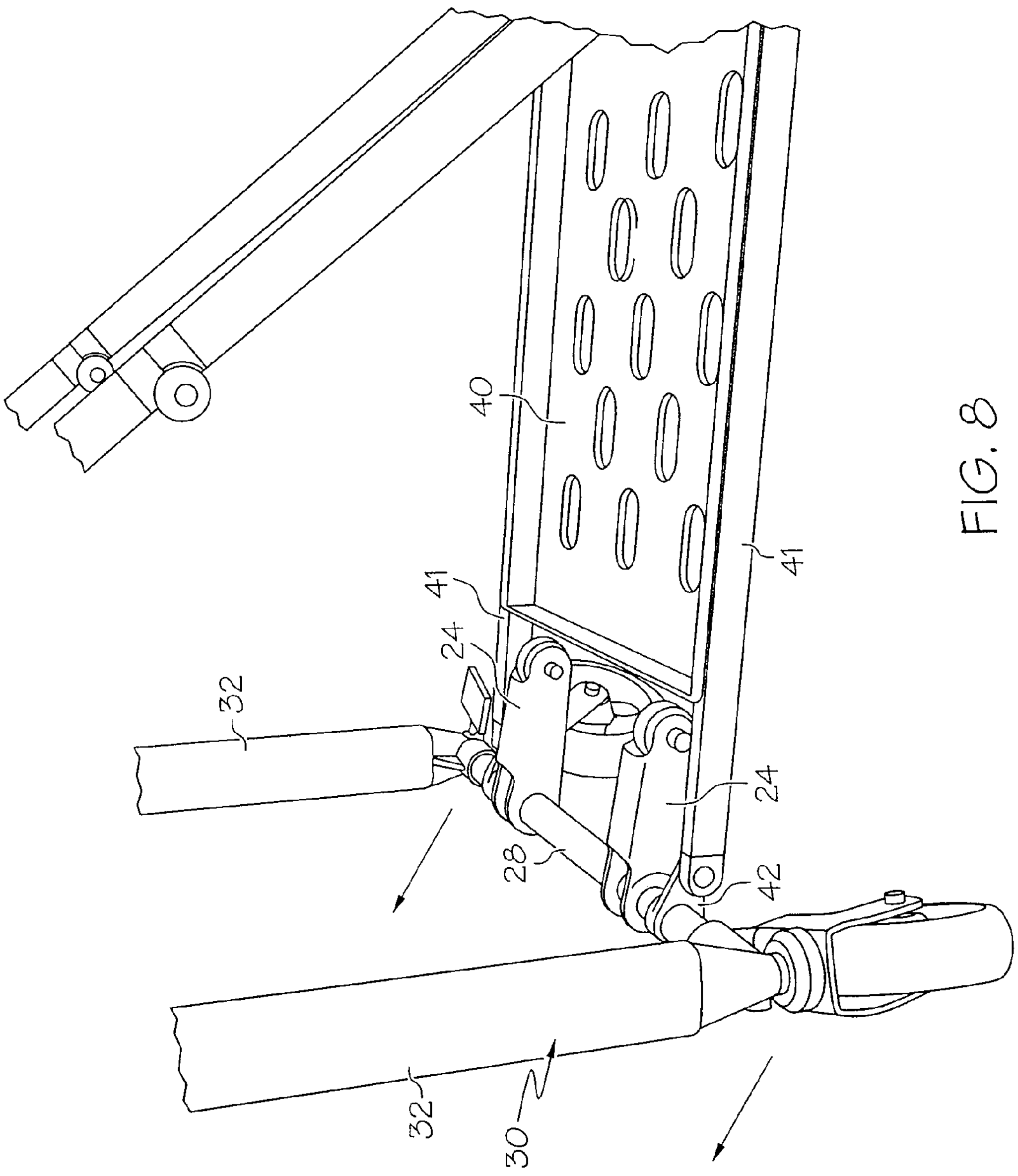
Figure 9:
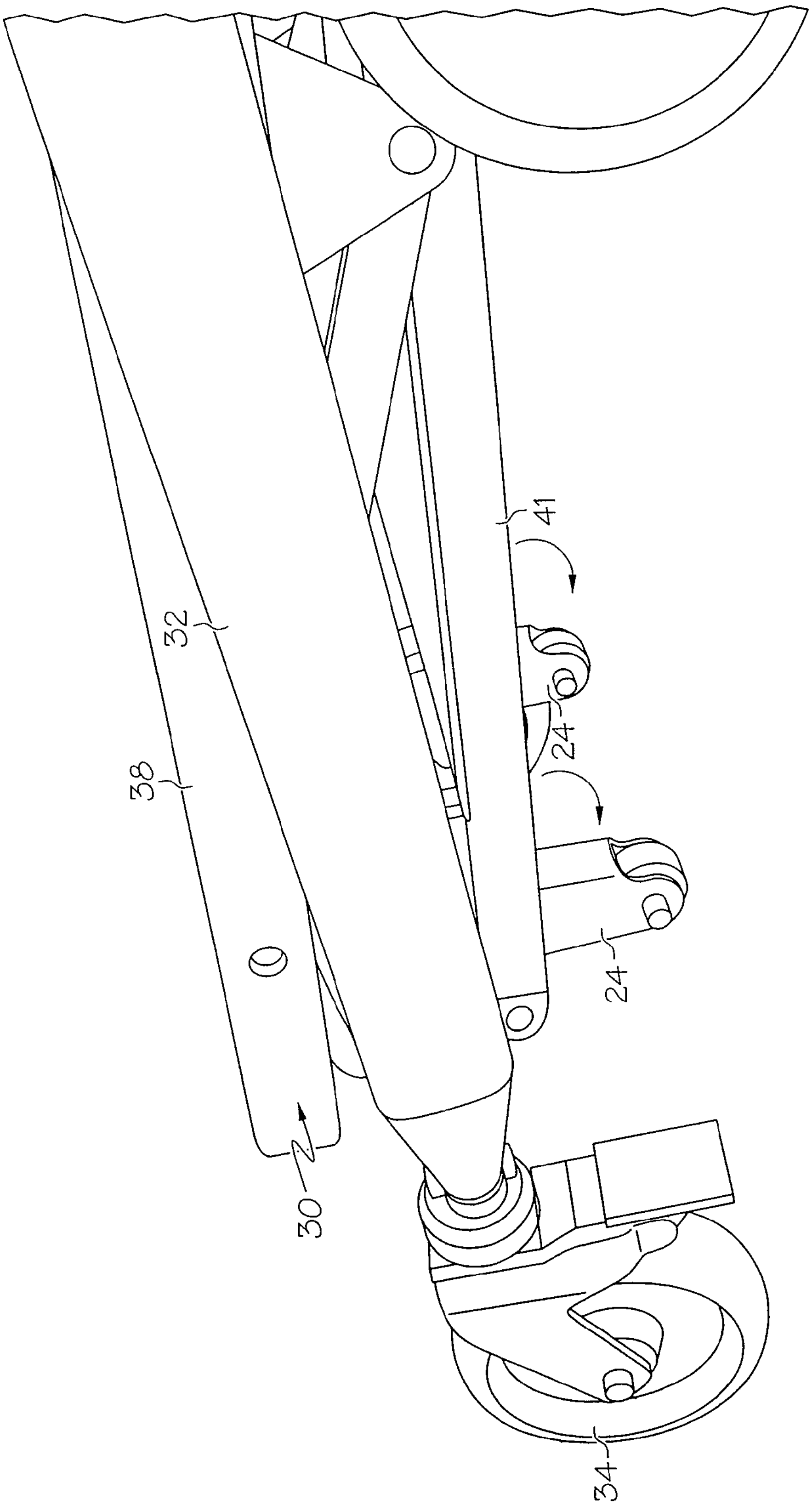
FIG. 9 is side perspective view of a roll-in cot in a lowered or folded position having mounting hooking pegs (in an extended and interfering position) according to the present invention.

As shown best by FIGS. 7-9, the mounting pegs 24 are mounted to a frame member 28 of a cot, generally indicated by symbol 30. In the illustrated embodiment, the frame member 28 is mounted between a pair of downward swinging legs 32, having wheels 34 at their free ends. The legs 32, as with another pair of wheeled legs 36, are configured to hinge away upwardly and fold rearwardly under a patient support surface 38 of the cot 30 when pushing the cot onto the support surface or floor 19 of the transport vehicle, and unfold when removing the cot 30 from the transport vehicle in the opposite direction. As the legs 32 fold when loading the cot 30 into the transport vehicle, the mounting pegs 24 rotate downwardly as illustrated by FIG. 9.

As best shown by FIG. 8, the rotation of mounting pegs 24 is effectuated by the rearward swinging of frame member 28 mounted between the legs 32 and 36, which also folds rearwardly under the patient support surface 38 with the legs 32 and 36. A swing arm 42 mounted pivotally to lower frame links 41 and fixed to the frame member 28, rotates the frame member 28, and hence mounting pegs 24 fixed thereto, with the rearward movement of the lower frame links 41 and legs 32 and 36. An optional tray 40 may mount to and between the pair of lower frame links 41.

As best shown by FIGS. 6 and 10, the catches 26 each provide a wedged shaped channel 44, which is sized wider at a rearward end portion 46 and narrows to a fixed spacing at a forward end portion 48. In this manner, each channel 44 acts as guide for the respective mounting peg 24 when it moves forward from the rearward end portion 46 to the forward end portion 48. The forward end portion 48 is sized to accommodate a roller 50 and extended axle 52 of the respective mounting peg 24, and restrain the mounting peg 24 from forward and lateral movement. A lip 54 in the forward end portion 48 of the catch 26 restrains the axle 52 vertically as best shown by FIG. 10.

In the illustrative embodiment of FIGS. 6 and 10, the release mechanism 16 is provided between the catches 26 of the rearward mounting part 14 and rails 18. A handle 56 of the release mechanism 16 is connected at its forward end to a pull 58 which, in turn, is joined to the interconnecting releasing mechanism 60, which is best shown by FIGS. 2 and 3.

Figure 2:
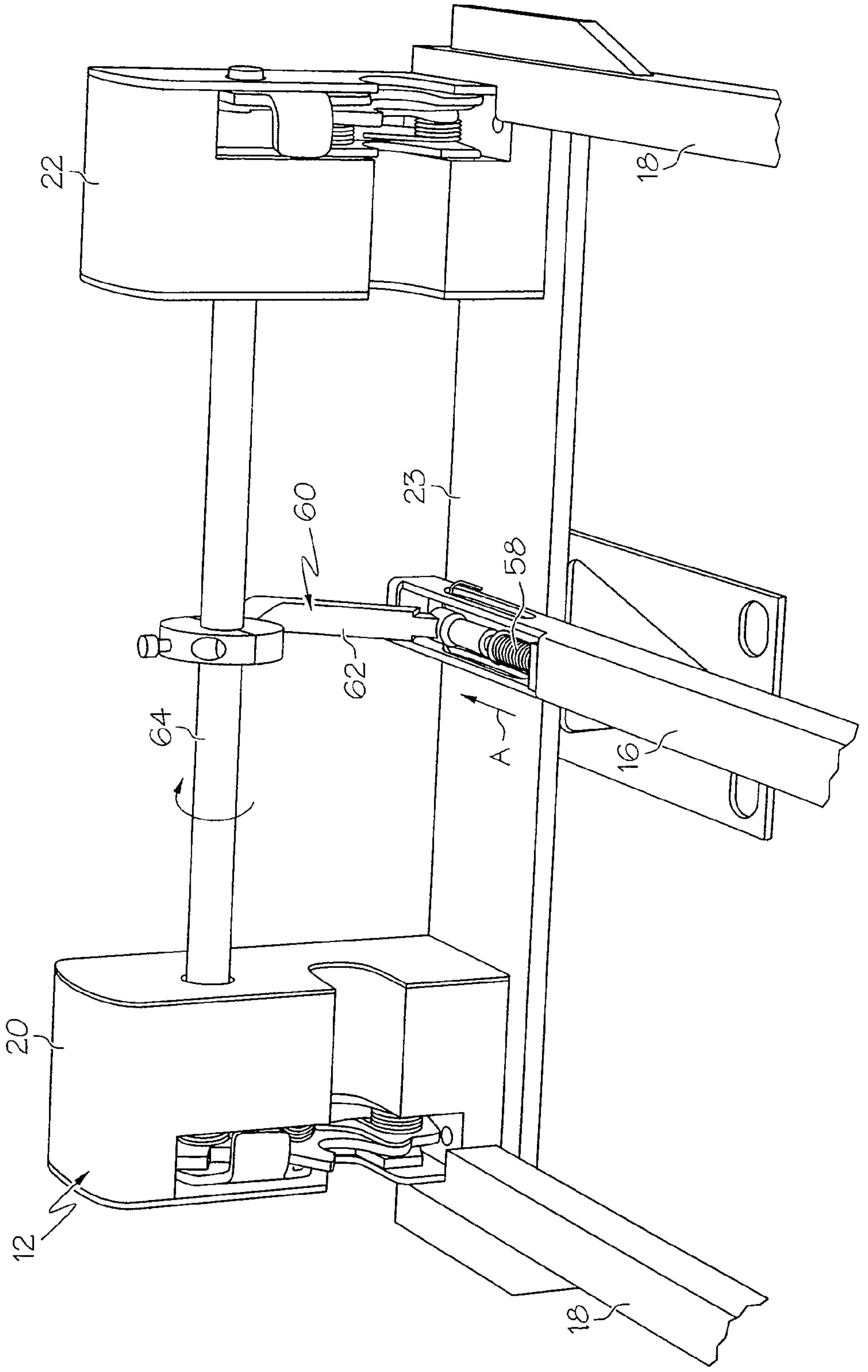
FIG. 2 is a perspective view from above of a forward mounting part the cot fastening system depicted in FIG. 1 in an unlocked arrangement.
Figure 3:
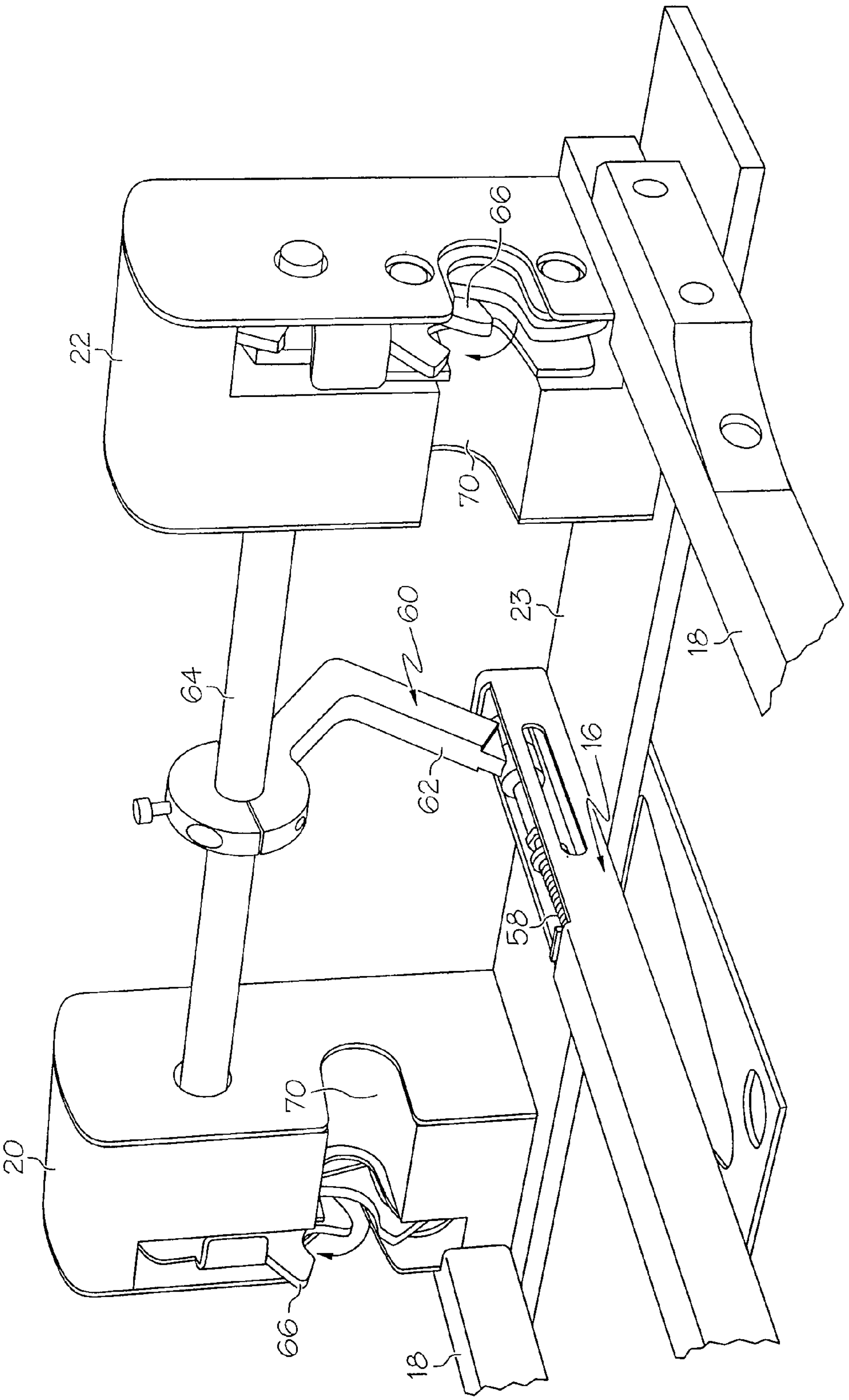
FIG. 3 is a perspective view from a side of a forward mounting part the cot fastening system depicted in FIG. 1 in an unlocked arrangement.
Figure 4:
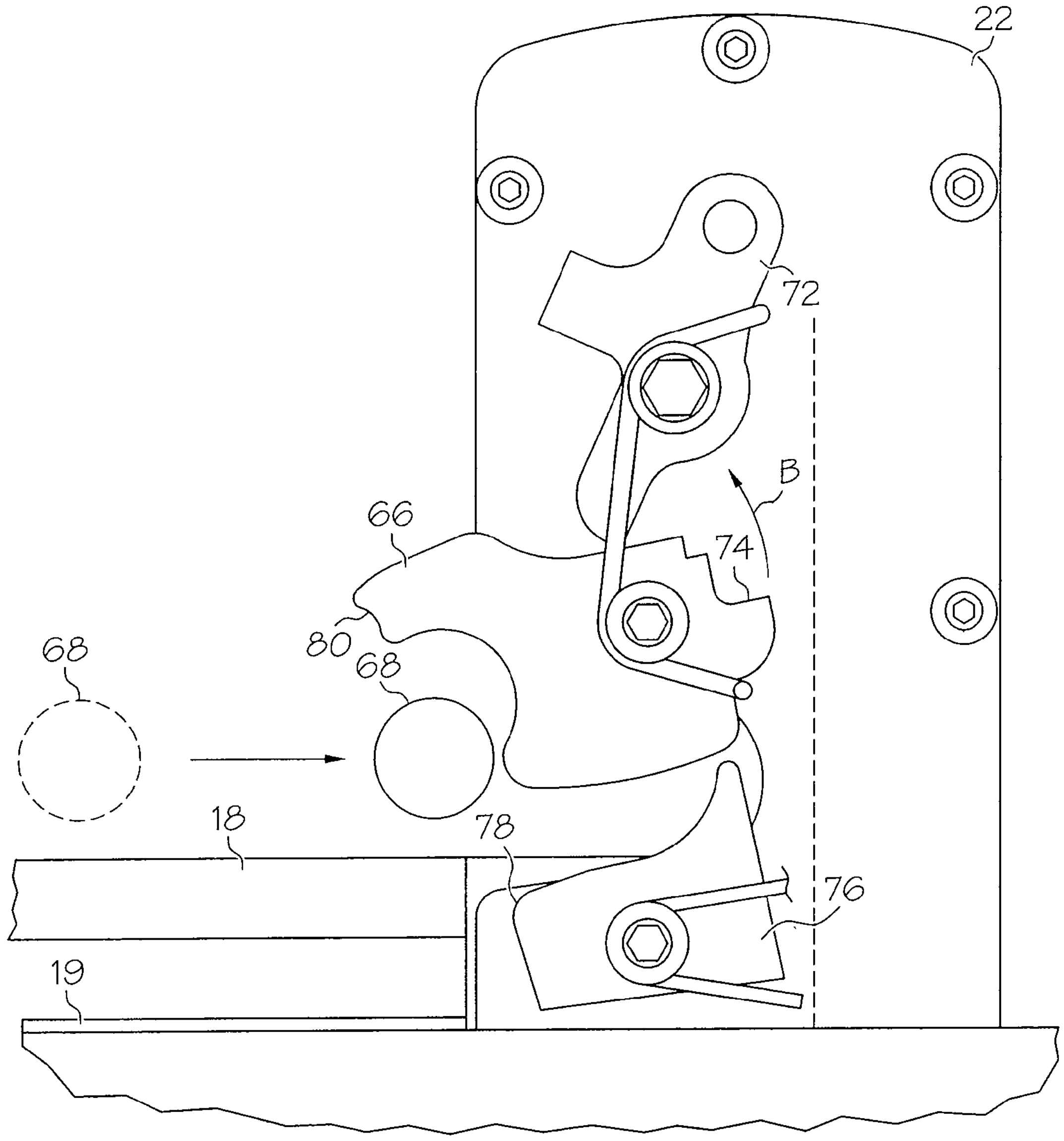
FIG. 4 is a sectional side view of a securing mechanism of the cot fastening system depicted in FIG. 1 in a unlocked or release arrangement.

The pull 58 is biased in the direction indicated by arrow A, which is best shown in FIG. 2. Pulling rearwardly (direction opposite to that indicated by arrow A) on handle 56 (FIG. 6), pivots an arm 62 of the interconnecting releasing mechanism 60 rearwardly, which rotates a rod 64. The rod 64 interconnects the securing mechanisms 20, 22. The rotation of the rod 64 as described, causes a latching member 66 of each securing mechanism to spring to a release position, which is shown by FIG. 4 from a locked position, shown by FIG. 5. As both securing mechanisms 20 and 22 are identical in operation and parts, only securing mechanism 22 is discussed in references to FIGS. 4 and 5 hereafter.

Figure 5:
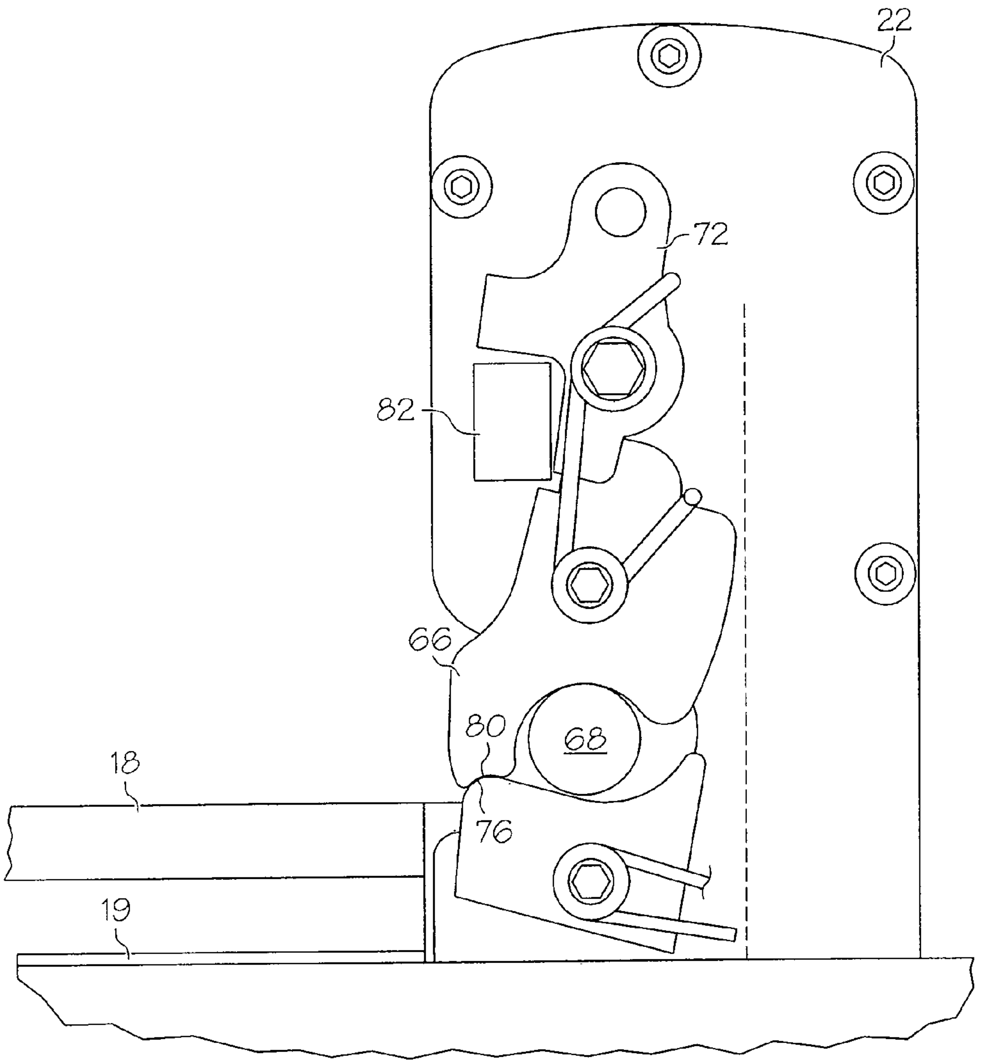
FIG. 5 is a sectional side view of a securing mechanism of the cot fastening system depicted in FIG. 1 in a locked or secured arrangement.

With reference to FIG. 4, when the cot has reached the locking location, a cross-member 68, which forms part of the cot undercarriage framework, is urged against the latching member 66 of the securing mechanism 22 of the forward mounting part. Continued forward urging of the cross-member 68 draws the cross-member 68 into a recess 70 (FIG. 3) of the securing mechanism 22 and causes downward rotation of the latching member 66. As the latching member 66 rotates in the direction indicated by arrow B (FIG. 4), a securing member 72 springs into engagement with a recess portion 74 of the latching member 66 automatically locking the cross-member 68 in the locked position (FIG. 5). As the latching member 66 is rotated to the locked position, a level member 76 is pivoted by the latching member such that a thumb portion 78 of the level member 76 engages a finger portion 80 of the latching member 66 in the locked position enclosing the cross-member 68 therein.

In the locked position, a sliding bolt 82 springs into a secure position, which prevents the securing member 72 from pivoting out of its engagement with the recess portion 74 of the latching member 66. Pulling on handle 56 slides the bolt from the secure position and rotates the securing member 72 back to the unengaged position shown by FIG. 4. As the securing member 72 clears from the recess position 74, the latching member 66 and lever 76 spring back to the released position also shown by FIG. 4, thereby permitting the cross-member 68, and hence cot 30, to be removed without hindrance from the cot fastening system 10.

Figure 11:
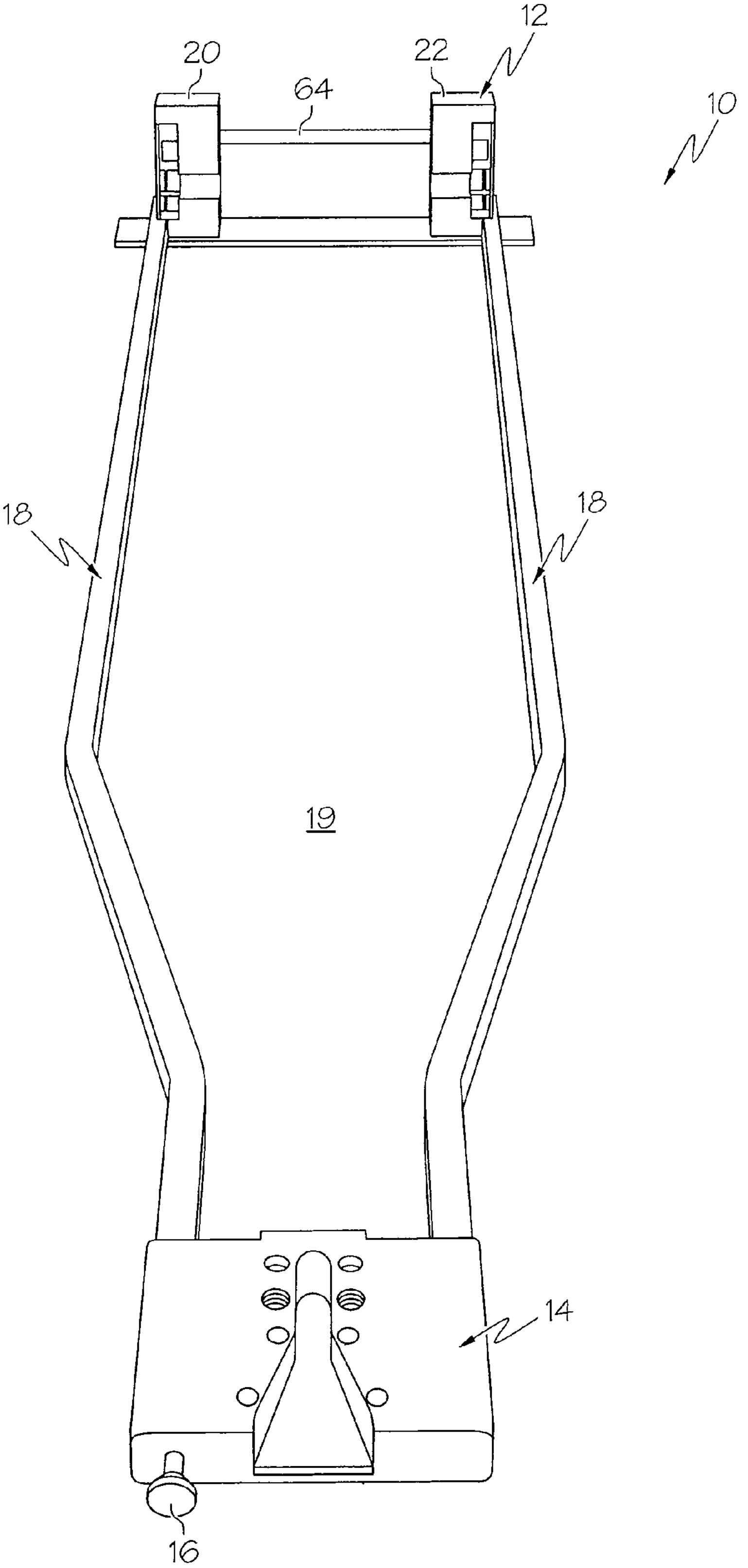
FIG. 11 is a perspective view from above of another embodiment of a cot fastening system according to the present invention.
Figure 12:
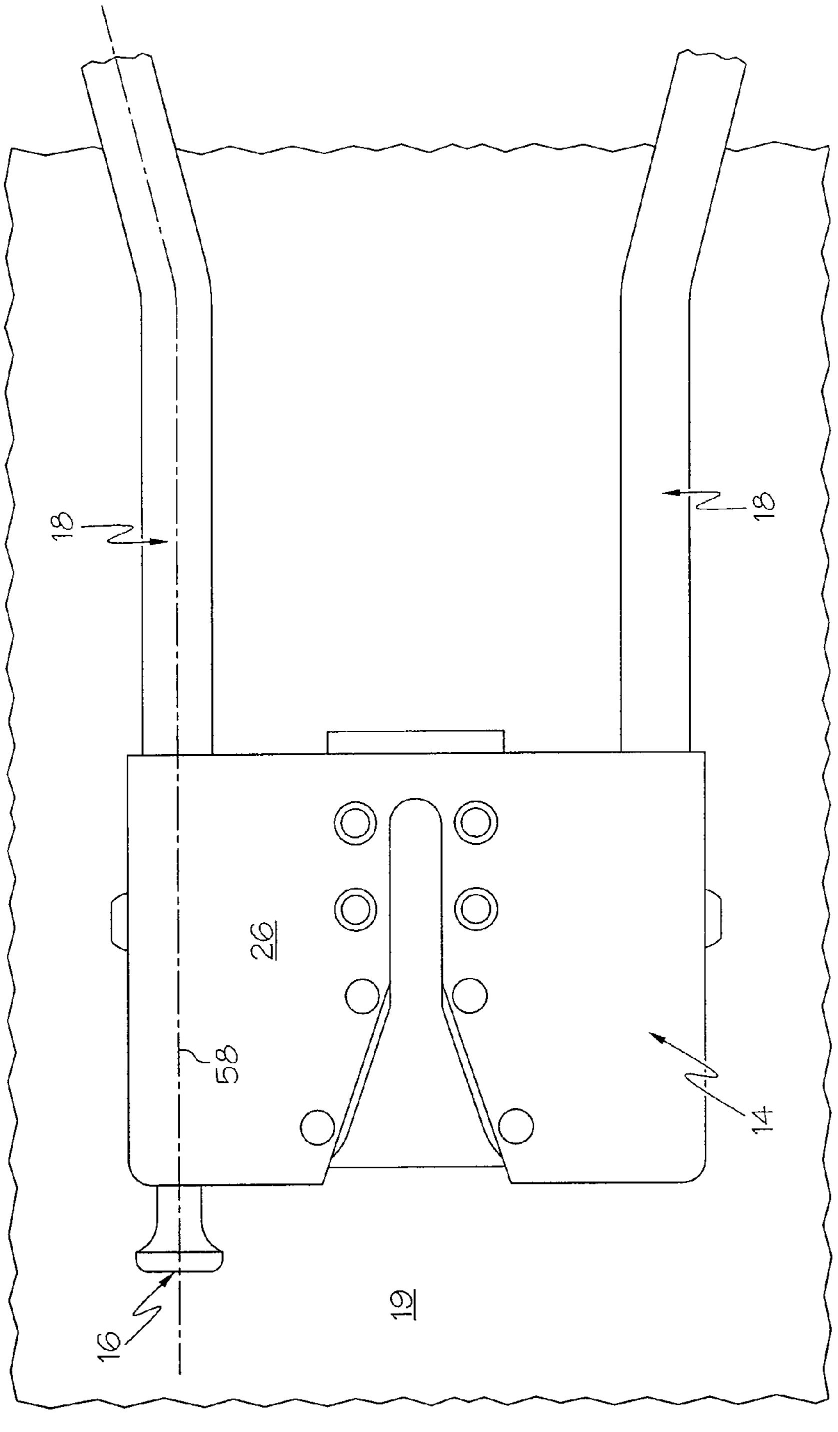
FIG. 12 is a perspective view from above of a rearward mounting part the cot fastening system depicted in FIG. 12.

Whilst the above has been given by way of illustrative example of the invention, many modifications and variations may be made thereto by persons skilled in the art without departing from the spirit of invention. For example, in another embodiment shown by FIGS. 11 and 12, the cot fastening system 10 is provided the forward mounting part 12, a rearward mounting part 14, a release mechanism 16, and a pair of rails 18 interconnecting the mounting parts 12 and 14. In this embodiment, the rear mounting part comprises a single catch 26, and one of the rails 18 accommodates the pull 58 of the release mechanism 16. At the forward mounting part 12 the interconnecting releasing mechanism 60 are provided internally to one of the securing mechanism 20, which are also interconnected by rod 64 and which operate in the same fashion as described above in the previous sections.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

The invention claimed is:

1. A combination cot and fastening system for securing the cot to a mobile transport vehicle, said combination comprising:

the cot having legs, a patient support surface attached to said legs, said legs configured to hinge upwardly and fold rearwardly under said patient support surface when pushing said cot into said transport vehicle, and unfold when removing said cot from said transport vehicle in an opposite direction, a cross-member, and at least one mounting peg configured to rotate downwardly when loading said cot into said transport vehicle; and the fastening system having a forward mounting part, a rearward mounting part, a pair of automatically locking securing mechanisms attached to said forward mounting part and configured to secure the cross-member of the cot thereto, a rearwardly located securing mechanism attached to said rearward mounting part and configured to secure to the at least one mounting peg of the cot when rotated downwardly, rails connecting said forward mounting part with said rearward mounting part, wherein said rails are configured to guide cross-member of the cot into the pair of automatically locking securing mechanisms and the at least one mounting peg into the rearwardly located securing mechanism, and a release mechanism connected to the pair of automatically locking securing mechanisms and the rearward mounting part, wherein said release mechanism is configured to release the cross-member of the cot from said pair of automatically locking securing mechanisms when secured thereto upon activation of said release mechanism.

2. The combination cot and fastening system according to claim 1, wherein the rearwardly located securing mechanism provides a catch having a forward end portion and a rearward end portion, wherein said forward end portion is configured to accommodate said mounting peg therein.

3. The combination cot and fastening system according to claim 2, wherein the mounting peg provides a roller and an axle, wherein said roller and said axle are restrained from forward and lateral movement by said forward end portion.

4. The combination cot and fastening system according to claim 2, wherein said at least one mounting peg is a pair of mounting pegs each providing a roller and an axle, wherein said rearwardly located securing mechanism comprises a respective catch for first guiding up loading and then restraining forward and lateral movement of the roller and axle of each associated one of the pair of mounting pegs.

5. The fastening system of claim 1, wherein when the cross member of the cot is pressed against a latching member of each of the pair of automatically locking securing mechanisms, each of the securing mechanisms is configured to draw the cross member into a recess thereof and cause downward rotation of said latching member and engagement of a securing member to automatically lock the cross member in a locked position.

6. A method of fastening a cot to a mobile transport vehicle, said method comprising:

providing a cot having a cross-member and at least one mounting peg, the at least one mounting peg configured to rotate downwardly when loading said cot into said transport vehicle;

providing to the mobile transport vehicle a fastening system having a forward mounting part, a rearward mounting part, a pair of automatically locking securing mechanisms attached to said forward mounting part and configured to secure the cross-member of the cot thereto, a rearwardly located securing mechanism attached to said rearward mounting part and configured to secure to the at least one mounting peg of the cot when rotated downwardly, rails connecting said forward mounting part with said rearward mounting part, wherein said rails are configured to guide cross-member of the cot into the pair of automatically locking securing mechanisms and the at least one mounting peg into the rearwardly located securing mechanism, and a release mechanism connected to the pair of automatically locking securing mechanisms and the rearward mounting part, wherein said release mechanism is configured to release the cross-member of the cot from said pair of automatically locking securing mechanisms when secured thereto upon activation of said release mechanism; and transitioning the cot along the rails which guide the cot into the pair of automatically locking securing mechanisms to secure automatically the cross-member thereto as well as the mounting peg to the rearwardly located securing mechanism.

7. The method of claim 6, wherein the cot is released from the fastening system by activating said release mechanism.

8. The method of claim 6, wherein said at least one mounting peg is a pair of mounting pegs each providing a roller and an axle, wherein said rearwardly located securing mechanism comprises a respective catch for first guiding up loading and then restraining forward and lateral movement of the roller and axle of the associated one of the pair of mounting pegs.

9. The method of claim 6, wherein each of said pair of automatically locking securing mechanisms comprises a sliding bolt and a securing member wherein said sliding bolt is configured to prevent said securing member from disengaging when said cross-member of the cot is engaged with the pair of automatically locking securing mechanisms.

10. The method of claim 6, wherein said release mechanism comprises a handle and a connecting device, responsive to said handle such that upon activation of said handle, said securing mechanisms are disengaged.

11. The method of claim 8, wherein each catch is wedge shaped.

12. The method of claim 6, further comprising moving the cross member into a latching member of each of said securing mechanisms whereby said cross member is drawn into a recess thereof and closing a respective latching member on the cross member.

13. The method of claim 6, wherein the release mechanism comprises an arm connected to a linkage, said linkage being connected to said securing mechanisms, and said method further comprises using the release mechanism which moves the arm and causes rotation of said linkage to effect a respective latching member of said securing mechanisms to spring to a release position from a locked position.

14. The method of claim 6, comprising the further step of pulling on a handle to simultaneously release said securing mechanisms.

* * * * *

UNITED STATES PATENT AND TRADEMARK OFFICE

CERTIFICATE OF CORRECTION

PATENT NO. : 8,308,212 B2
APPLICATION NO. : 12/667749
DATED : November 13, 2012
INVENTOR(S) : Steve Schrand It is certified that error appears in the above-identified patent and that said Letters Patent is hereby corrected as shown below:

In the Claims:

Col. 5, Claim 5, Lines 57-58, “cross member” should read --cross-member--;

Col. 5, Claim 5, Line 61, “cross member” should read --cross-member--;

Col. 5, Claim 5, Line 63, “cross member” should read --cross-member--;

Col. 6, Claim 12, Line 51, “cross member” should read --cross-member--;

Col. 6, Claim 12, Line 52, “cross member” should read --cross-member--; and

Col. 6, Claim 12, Line 54, “cross member” should read --cross-member--.

Signed and Sealed this
Ninth Day of July, 2013

Teresa Stanek Rea
*Acting Director of the United States Patent and Trademark Office*